United States Patent
Li et al.

(10) Patent No.: US 7,649,037 B1
(45) Date of Patent: Jan. 19, 2010

(54) CURABLE COMPOSITIONS

(75) Inventors: Wei Helen Li, San Ramon, CA (US);
Stanley L. Lehmann, Martinez, CA (US); Raymond S. Wong, San Ramon, CA (US)

(73) Assignee: Henkel Corporation, Rocky Hill, CT (US)

( * ) Notice: Subject to any disclaimer, the term of this patent is extended or adjusted under 35 U.S.C. 154(b) by 618 days.

(21) Appl. No.: 11/553,023

(22) Filed: Oct. 26, 2006

Related U.S. Application Data

(62) Division of application No. 10/607,111, filed on Jun. 27, 2003, now Pat. No. 7,157,509.

(51) Int. Cl.
*B32B 25/02* (2006.01)
*C08K 5/357* (2006.01)

(52) U.S. Cl. .......................... 524/87; 524/94; 524/315; 524/354; 524/356; 524/404; 524/424; 524/442; 524/494; 428/292.1; 428/297.1; 428/297.4; 428/407; 428/426; 428/446; 428/500; 428/704

(58) Field of Classification Search .................... 524/87, 524/94, 315, 354, 356, 404, 424, 442, 494; 428/292.1, 297.1, 297.4, 426, 446, 500, 704; 427/407.1; 106/287.22
See application file for complete search history.

(56) References Cited

U.S. PATENT DOCUMENTS

| | | | |
|---|---|---|---|
| 4,607,091 A | 8/1986 | Schreiber | 528/96 |
| 4,806,267 A | 2/1989 | Culbertson et al. | 252/182.23 |
| 5,021,484 A | 6/1991 | Schreiber et al. | 524/100 |
| 5,200,452 A | 4/1993 | Schreiber | 524/398 |
| 5,443,911 A | 8/1995 | Schreiber et al. | 428/413 |
| 5,543,516 A | 8/1996 | Ishida | 544/69 |
| 6,207,786 B1 | 3/2001 | Ishida et al. | 528/94 |
| 6,323,270 B1 | 11/2001 | Ishida et al. | 524/445 |
| 6,534,179 B2 | 3/2003 | Japp et al. | 428/413 |
| 6,620,905 B1 | 9/2003 | Musa | 528/423 |
| 2003/0018131 A1 | 1/2003 | Davis et al. | 525/107 |

FOREIGN PATENT DOCUMENTS

| | | |
|---|---|---|
| CN | 9411852.5 | 10/2000 |
| EP | 0 458 739 | 4/1991 |
| EP | 0 518 060 A2 | 5/1992 |
| EP | 0 323 142 B1 | 9/1993 |
| EP | 1 408 152 | 1/2004 |
| EP | 1 415 782 | 5/2004 |
| JP | 06 345898 | 12/1994 |
| JP | 10 3010678 | 11/1998 |
| JP | 1259830 | 6/1999 |
| JP | 2000 273291 | 10/2000 |
| JP | 2003 082117 | 3/2003 |
| WO | WO 03/013820 | 2/2003 |

OTHER PUBLICATIONS

S. Rinndusit and H. lshida, "Development of New Class of Electronic Packaging Materials Based on Ternary System of Benzoxazine, Epoxy, and Phenolic Resin," Polymer, 41, 7941-49 (2000).

H. Ishida and D. Allen, "Mechanical Characterization of Copolymers based on Benzoxazine and Epoxy", Polymer, vol. 37, No. 20, pp. 4487-4495 (1996).

H. Ishida and Y. Rodriguez, "Curing Kinetics of a New Benzoxazine-Based Phenolic Resin by Differential Scanning Calorimetry", Polymer, vol. 36, No. 16, pp. 3151-3158 (1995).

H. Kim and H. Ishida, "A Study on Hydrogen-Bonded Network Structure of Polybenzoxazines" J. Phys. Chem. A 106, pp. 3271-3280 (2002).

X. Liu and Y. Gu, "Study on the Volumetric Expansion of Benzoxazine Curing with Different Catalysts", J. Appl. Sci., vol. 84, pp. 1107-1113 (2001).

S. Rimdusit and H. Ishida, "Gelation Study of High Processability and High Reliability Ternary Systems based on Benzoxazine, Epoxy, and Phenolic Resins for an Application as Electronic Packaging Materials", Rheol Acta 41, pp. 1-9 (2002).

H. Kim, H. lshida, "Study on the Chemical Stability of Benzoxazine-Based Phenolic Resins in Carboxylic Acids", J. Appl. Polym. Sci., vol. 79, pp. 1207-1219 (2001).

H. Ishida, D. J. Allen, "Gelation Behavior of Near-Zero Shrinkage Polybenzoxazines", J. Appl. Polym. Sci., vol. 79, 406-417 (2001).

H. lshida, D.P. Sanders, "Improved Thermal and Mechanical Properties of Polybenzoxazines Based on Alkyl-Substituted Aromatic Amines", J. Polym. Sci.: Part B, vol. 38, pp. 3289-3301 (2000).

H. Ishida, D.P.Sanders, "Regioselectivity and Network Structure of Difunctional Alkyl-Substituted Aromatic Amine-Based Polybenzoxazines", Macromolecules, 33, 8149-8157 (2000).

N. Dansiri, et al., "Resin Transfer Molding of Natural Fiber Reinforced Polybenzoxazine Composities", J. Soc. of Plast. Engs., 23(3), 352-360, (2002).

Y. Gu, et al., "New Matrix based on Benzoxazine for Resin Transfer Molding (RTM and their Composites", *Fuhe Cailiao Xuebao*, 17(4), 32-37 (2000) (Abstract).

J. Jang, et al. "Toughness Improvement of Carbon-Fibre/ Polybenzoxazine Composites by Rubber Modification", *Composites Sci. and Tech.*, 60, 3, 457-463 (2000) (Abstract).

T. Takeichi, et al, "Synthesis and Properties of Polybenzoxazine Based Composites", Recent Res. Devel. Polymer Science, 4, 85-105 (2000).

(Continued)

*Primary Examiner*—Kriellion A Sanders
(74) *Attorney, Agent, or Firm*—Steven C. Bauman

(57) ABSTRACT

Curable compositions, such as benzoxazine-based ones, are useful in applications within the aerospace industry, such as for example as a heat curable composition for use as a matrix resin or an adhesive, and form the basis of the present invention.

23 Claims, 3 Drawing Sheets

OTHER PUBLICATIONS

S. B. Shen and H. Ishida, "Dynamic Mechanical and Thermal Characterization of High-Performance Polybenzoxazines", J. Polym. Sci.: Part B Polym. Phy., vol. 37, 3257-3268 (1999).

S. Rimdusit and H. lshida, "Synergism and Multiple Mechanical Relaxations Observed in Ternary Systems Based on Benzoxazine, Epoxy, and Phenlic Resins", J. Polym. Sci: Part B: Polym. Phy., vol. 38, 1687-1698 (2000).

J. Dunkers, H. Ishida, "Reaction of Benzoxazine-based Phenolic Resins with Strong and Weak Carbonxylic Acids and Phenols as Catalysts", J. Polym. Sci.: Part A: Polym. Chem., vol. 37, 1913-1921 (1999).

X. Zhang, A. C. Potter and D. H. Solomon, "The Chemistry of Novolac Resins—V. Reactions of Benzoxazine Intermediates", Polymer, vol. 39, 399-404 (1998).

X. Zhang and D. H. Solomon, "The Chemistry of Novolac Resins—VI. Reactions Between Benzoxazine Intermediates and Model Phenols", Polymer, vol. 39, No. 2, pp. 405-412 (1998).

Y. Wang and H. Ishida, "Devolopment of Low-Viscosity Benzoxazine Resins and Their Polymers", J. Appl. Polym. Sci., vol. 86, pp. 2953-2966 (2002).

K. Hemvichian and H. Ishida, Thermal Decomposition Processes in Aromatic Amine-Based Polybenzoxazines Investigated by TGA and GC-MS, Polymer, vol. 43, pp. 4391-4402 (2002).

B.M. Culbertson, "Cyclic Imino Ethers in Step-Growth Polymerizations", Prog. Polym. Sci., Article in Press (2001).

H. Kimura, S. Taguchi, A. Matsumoto, "Studies on New Type of Phenolic Resin (IX) Curing Reaction of Bisphenol A-Based Benzoxazine with Bisoxazoline and the Properties of the Cured Resin. II. Cure Reactivity of Benzoxazine", J. Appl. Polym. Sci., vol. 79, 2331-2339 (2001).

P. Chutayothin, H. Ishida, and S. Rowan, "Cationic Ring-Opening Polymerization of Monofunctional Benzoxazine", Polymer Reprints, 42(2), pp. 599-600,621-622 (2001).

T. Agag and T. Takeichi, "Novel Benzoxazine Monomers Containing p-Phenyl Propargyl Ether: Polymerization of Monomers and Properties of Polybenzoxazines", Macromolecules, 34, pp. 7257-7263 (2001).

H. Kimura, et al., "New Thermosetting Resin from Poly(p-vinylphenol) Based Benzoxazine and Epoly Resin", J. Appl. Polym. Sci, vol. 79, 555-565 (2001).

A. S. C. Lim, et al., "Chemistry of Novolac Resins. X. Polymerization Studies of HMTA and Strategically Synthesized Model Compounds", J. Polym. Sci.: Part A: Polym. Chem., vol. 37, 1347-1355 (1999).

H. Y. Low and H. lshida, "Mechanistic Study on the Thermal Decomposition of Polybenzoxazines: Effects of Aliphatic Amines", J. of Polym. Sci.: Part B: Polym. Phy., vol. 36, pp. 1935-1946 (1998).

H. Kimura, et al., "Epoxy Resin Cured by Bisphenol A. Based Benzoxazine", J. of Appl. Polym. Sci., vol. 68, 1903-1910 (1998).

J. E. McGrath, et al., "Syntheses and Characteristic of Segmented Polyimide-Polyorganosiloxane Copolymers", Adv. in Polym. Sci., vol. 140, pp. 61-105 (1999).

ULTEM 2000 (CAS Reg. No. 61128-46-9) (2003).

W. J. Burke, et al., "A new Arninoalkylation Reation. Condensation of Phenols with Dihydro-1, 3-Aroxazines", J. Org. Chem., vol. 30(10), pp. 3423-3427 (1965).

J. Jang and D. Seo, "Performance Improvement of Rubber-Modified Polybenzoxazine", J. Appl. Polym. Sci., vol. 67, pp. 1-10 (1998).

Raymond A. Pearson, "Toughening Epoxies Using Rigid Thermoplastic Particles", American Chemical Society, pp. 405-425 (1993).

Stress intensity factor, $K_{Ic}$, of rubber-toughened polybenzoxazine as a function of rubber content.

$T_g$ trends in rubber modification of polybenzoxazine with CTBN and ATBN.

CURABLE COMPOSITIONS

CROSS REFERENCE TO RELATED APPLICATIONS

This application is a division of U.S. patent application Ser. No. 10/607,111, filed Jun. 27, 2003 now U.S. Pat. No. 7,157,509.

BACKGROUND OF THE INVENTION

1. Field of the Invention

Curable compositions, such as benzoxazine-based ones, are useful in applications within the aerospace industry, such as for example as a heat curable composition for use as a matrix resin or an adhesive, and form the basis of the present invention.

2. Brief Description of Related Technology

Epoxy resins with various hardeners have been used extensively in the aerospace and electronics industries both as adhesives and as matrix resins for use in prepreg assembly with a variety of substrates.

Benzoxazines themselves have been reported in the literature as generally having a high glass transition temperature, good electrical properties (e.g., dielectric constant), and low flammability.

Blends of epoxy resins and benzoxazines are known. See e.g. U.S. Pat. No. 4,607,091 (Schreiber), U.S. Pat. No. 5,021,484 (Schreiber), U.S. Pat. No. 5,200,452 (Schreiber), and U.S. Pat. No. 5,445,911 (Schreiber). These blends appear to be potentially useful in the electronics industry, as the epoxy resins can reduce the melt viscosity of benzoxazines allowing for the use of higher filler loading while maintaining a processable viscosity. However, epoxy resins oftentimes undesirably increase the temperature at which benzoxazines polymerize.

Ternary blends of epoxy resins, benzoxazine and phenolic resins are also known. See U.S. Pat. No. 6,207,786 (Ishida), and S. Rimdusit and H. Ishida, "Development of new class of electronic packaging materials based on ternary system of benzoxazine, epoxy, and phenolic resin," *Polymer,* 41, 7941-49 (2000).

Other resins, such as reactive monomers, polymers and oxazolines, polyimide/siloxane co-polymers and cyanate esters, are too known. See e.g. U.S. Pat. No. 4,806,267 (Culbertson), in connection with oxazolines and J. McGrath et al., "Synthesis and Characterization of Segmented Polyimide-Polyorganosiloxane Copolymers", *Advances in Polym. Sci.,* Vol. 140, Springer-Verlag, Berlin 61-105 (1999) in connection with polybenzoxazine polyimide-polyorganosiloxane co-polymers.

Moreover, in J. Jang et al., "Performance Improvement of Rubber Modified Polybenzoxazine", *J. Appl. Polym. Sci.,* 67, 1-10 (1998), the authors report the use of polybenzoxazine modified with amine-terminated, butadiene acrylonitrile rubber and with carboxyl-terminated, butadiene acrylonitrile rubber to improve mechanical properties. The polybenzoxazine chosen was synthesized from bisphenol A, formaldehyde and the aromatic amine, aniline.

Notwithstanding the state of the technology, there has been no disclosure, teaching or suggestion to prepare a heat curable composition based on the combination of a benzoxazine prepared from bisphenol A, formaldehyde and alkyl amines, and amine-terminated, butadiene acrylonitrile rubber, let alone one with improved performance properties.

SUMMARY OF THE INVENTION

The inventive compositions include a heat curable composition comprising the combination of a benzoxazine component and a toughener component.

In one aspect, the invention provides a benzoxazine component comprising

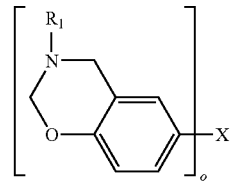

where o is 1-4, X is a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), and $R_1$ is alkyl, such as methyl, ethyl, propyls and butyls; and a toughener component comprising acrylonitrile-butadiene co-polymer having secondary amine terminal groups ("ATBN").

In a more specific embodiment of that aspect of the invention, the benzoxazine component is embraced by

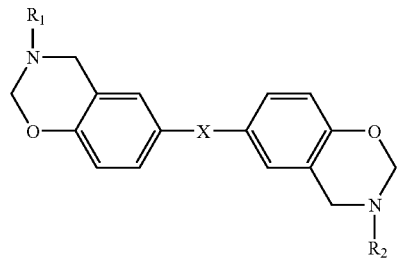

where X is selected from the group consisting of a direct bond, $CH_2$, $C(CH_3)_2$, C=O, S, S=O and O=S=O, and $R_1$ and $R_2$ are the same or different and are selected from methyl, ethyl, propyls and butyls.

In yet a more specific embodiment of that aspect of the invention, the benzoxazine component is embraced by

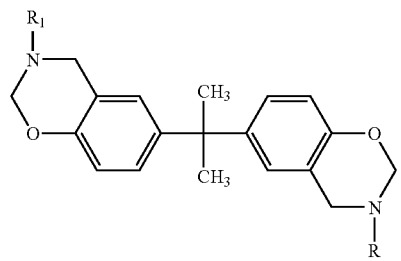

where $R_1$ and $R_2$ are the same or different and are selected from methyl, ethyl, propyls and butyls, though in a particularly desirable embodiment $R_1$ and $R_2$ are each methyl.

Cured reaction products of the inventive compositions are capable of demonstrating at least one of a wet Tg of at least 350° F., such as in the range of 350 to 455° F., a toughness measured by $G_{Ic}$ of at least 1.9 in-lb./in$^2$, such as in the range of 1.9 to 4.0 in-lb./in$^2$, a percent decrease in ΔH of at least 15% compared with a benzoxazine prepared from bisphenol F and aniline, and a percent decrease in wet Tg compared with dry Tg with increased toughener concentration of less than 6%.

Cured reaction products of the inventive compositions are also capable of demonstrating a Tg and toughness measured by GI$_c$ increase as the amount of toughener in the composition increases.

Moreover, cured reaction products of the inventive compositions should also have a cured density of less than 1.2 g/cc.

The invention is further directed to prepregs of the inventive compositions and cured reaction products thereof, prepregs of the inventive compositions and cured reaction products thereof, towpregs of the inventive compositions and cured reaction products thereof, and processes for producing the prepregs and towpregs, adhesive compositions of the inventive compositions and films thereof, methods of preparing and using the inventive compositions, articles of manufacture assembled with the inventive compositions and the like.

DETAILED DESCRIPTION OF THE INVENTION

Figure 1:
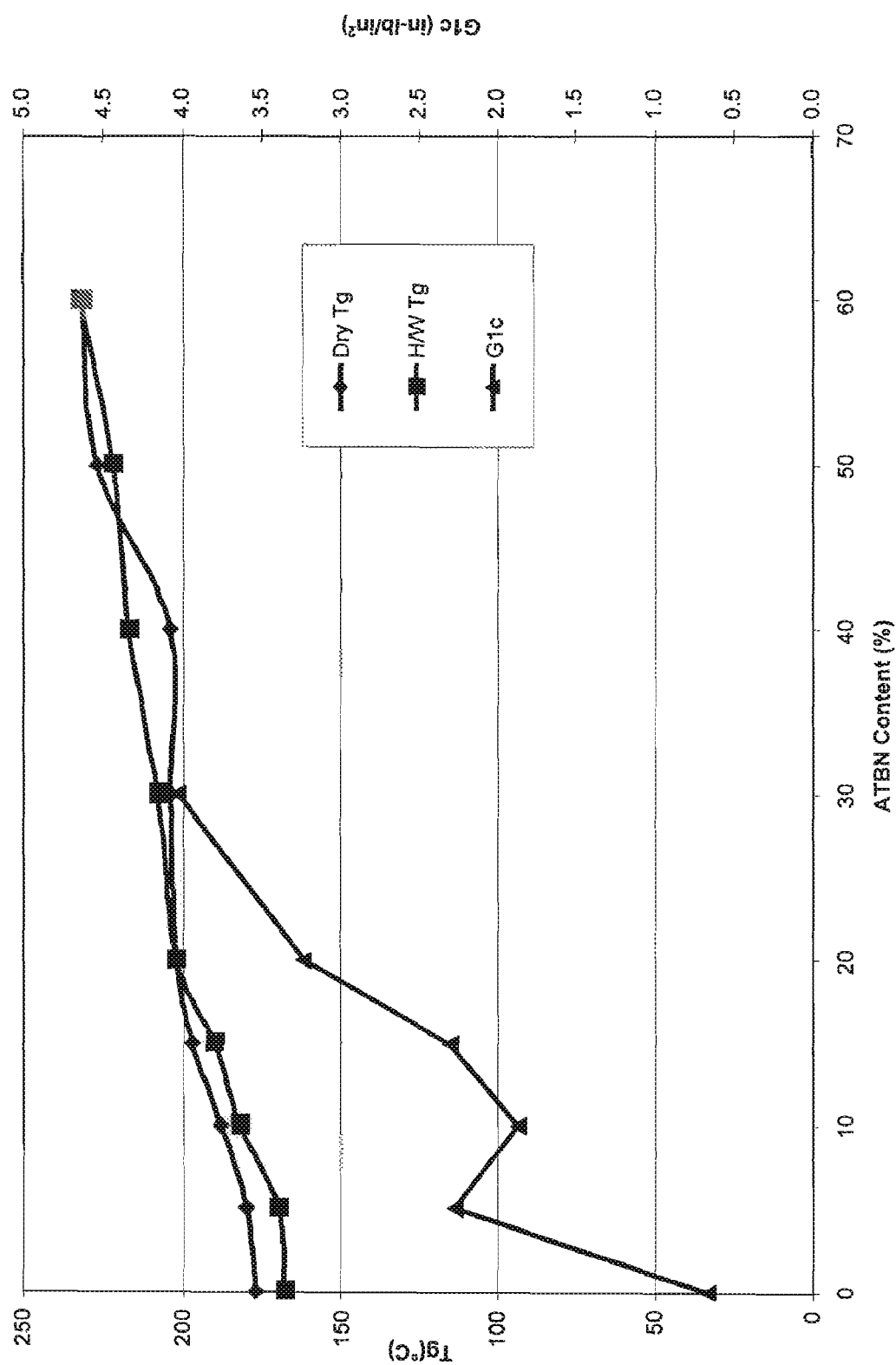
FIG. 1 depicts a plot of glass transition temperature (left y axis) vs. toughness vs. G$_{IC}$ (right y axis) for benzoxazine with increasing ATBN concentration.

As noted above, the present invention provides generally a heat curable composition comprising the combination of a benzoxazine component and a toughener component.

In one aspect, the invention provides a benzoxazine component comprising

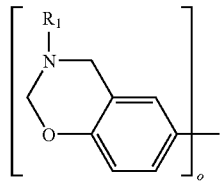

where o is 1-4, X is a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), and R$_1$ is alkyl, such as methyl, ethyl, propyls and butyls; and a toughener component comprising ATBN.

In a more specific embodiment of that aspect of the invention, the benzoxazine component is embraced by

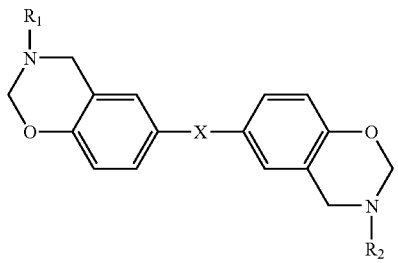

where X is selected from the group consisting of a direct bond, CH$_2$, C(CH$_3$)$_2$, C=O, S=O and O=S=O, S, and R$_1$ and R$_2$ are the same or different and are selected from methyl, ethyl, propyls and butyls.

In yet a more specific embodiment of that aspect of the invention, the benzoxazine component is embraced by

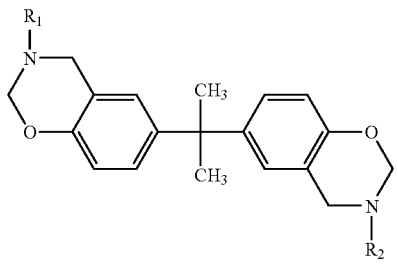

where R$_1$ and R$_2$ are the same or different and are selected from methyl, ethyl, propyls and butyls, though in a particularly desirable embodiment R$_1$ and R$_2$ are each methyl.

Cured reaction products of the inventive compositions are capable of demonstrating at least one of a wet Tg of at least 350° F., such as in the range of 350 to 450° F., a toughness measured by G$_{Ic}$ of at least 1.9 in-lb./in$^2$, such as in the range of 1.9 to 4.0 in-lb./in$^2$, a percent decrease in ΔH of at least 15% compared with a benzoxazine prepared from bisphenol F and aniline, and a percent decrease in wet Tg compared with dry Tg with increased toughener concentration of less than 6%.

Cured reaction products of the inventive compositions are also capable of demonstrating improved Tg and toughness measured by GI$_c$ increase as the amount of toughener in the composition increases.

Moreover, cured reaction products of the inventive compositions should also have a cured density of less than 1.2 g/cc.

The benzoxazine component should be present in an amount in the range of about 10 to about 99 percent by weight, such as about 25 to about 75 percent by weight, desirably about 35 to about 65 percent by weight, based on the total weight of the composition.

The toughener component, ATBN, should be present in an amount in the range of about 1 to about 90 percent by weight, such as about 10 to about 70 percent by weight, desirably about 15 to about 30 percent by weight, based on the total weight of the composition.

The benzoxazine component of the present invention may typically be prepared by reacting a phenolic compound, such as a bisphenol A, bisphenol F, bisphenol S or thiodiphenol, with an aldehyde and an alkyl amine. U.S. Pat. No. 5,543,516, hereby expressly incorporated herein by reference, describes a method of forming benzoxazines, where the reaction time can vary from a few minutes to a few hours, depending on reactant concentration, reactivity and temperature. See also Burke et al., *J. Org. Chem.*, 30(10), 3423 (1965); see generally U.S. Pat. No. 4,607,091 (Schreiber), U.S. Pat. No. 5,021,484 (Schreiber), U.S. Pat. No. 5,200,452 (Schreiber) and U.S. Pat. No. 5,443,911 (Schreiber).

Benzoxazines are presently available from several sources commercially, including Vantico, Inc., Brewster, N.Y., Georgia-Pacific Resins, Inc. and Shikoku Chemicals Corporation, Chiba, Japan, the least of which offers among others B-a, B-m, F-a, C-a and F-a benzoxazine resins. Of these, the benzoxazine component of the present invention is oftentimes desirably within the B-m benzoxazine resin family.

Benzoxazine polymerization can also be initiated by cationic initiators, such as Lewis acids, and other known cationic initiators, such as metal halides; organometallic derivatives; metallophorphyrin compounds such as aluminum phthalocyanine chloride; methyl tosylate, methyl triflate, and triflic acid; and oxyhalides.

The inventive compositions may also include coreactants, curatives and/or catalysts for the benzoxazines component. Examples include Lewis acids, such as phenols and derivatives thereof, strong acids, such as alkylenic acids and cationic catalysts.

The invention relates also to prepregs formed from a layer of fibers infused with the inventive heat curable composition.

In this regard, the invention relates also to a processes for producing a prepreg. One such process includes the steps of (a) providing a layer of fibers; (b) providing the inventive heat curable composition; and (c) joining the heat curable composition and the layer of fibers to form a prepreg assembly, and exposing the resulting prepreg assembly to elevated temperature and pressure conditions sufficient to infuse the layer of fibers with the heat curable composition to form a prepreg.

Another such process for producing a prepreg, includes the steps of (a) providing a layer of fibers; (b) providing the inventive heat curable composition in liquid form; (c) passing the layer of fibers through the liquid heat curable composition to infuse the layer of fibers with the heat curable composition; and (d) removing excess heat curable composition from the prepreg assembly.

The fiber layer may be constructed from unidirectional fibers, woven fibers, chopped fibers, non-woven fibers or long, discontinuous fibers.

The fiber chosen may be selected from carbon, glass, aramid, boron, polyalkylene, quartz, polybenzimidazole, polyetheretherketone, polyphenylene sulfide, poly p-phenylene benzobisoaxazole, silicon carbide, phenolformaldehyde, phthalate and napthenoate.

The carbon is selected from polyacrylonitrile, pitch and acrylic, and the glass is selected from S glass, S2 glass, E glass, R glass, A glass, AR glass, C glass, D glass, ECR glass, glass filament, staple glass, T glass and zirconium oxide glass.

The invention further contemplates a towpreg formed from a bundle of such fibers infused with the inventive heat curable composition.

In this regard, the invention relates also to processes for producing a towpreg. In one such process, the steps include (a) providing a bundle of fibers; (b) providing the heat curable composition and (c) joining the heat curable composition and the bundle of fibers to form a towpreg assembly, and exposing the resulting towpreg assembly to elevated temperature and pressure conditions sufficient to impregnate the bundle of fibers with the heat curable composition to form a towpreg.

In another such process, the steps include (a) providing a bundle of fibers; (b) providing the inventive heat curable composition in liquid form; (c) passing the bundle of fibers through the liquid heat curable composition to impregnate the bundle of fibers with the heat curable composition; and (d) removing excess heat curable composition from the towpreg assembly, thereby forming the towpreg.

The inventive composition may also include an additional toughener component, examples of which include poly(propylene) oxide; amine-terminated polyethylene sulfide, such as PES 5003P, available commercially from Sumitomo Chemical Company, Japan; core shell polymers, such as PS 1700, available commercially from Union Carbide Corporation, Danbury, Conn.; and BLENDEX 338, SILTEM STM 1500 and ULTEM 2000, which are available commercially from General Electric Company. ULTEM 2000 (CAS Reg. No. 61128-46-9) is a polyetherimide having a molecular weight ("Mw") of about 30,000±10,000.

The inventive composition may be in the form of an adhesive, in which case one or more of an adhesion promoter, a flame retardant, a filler, a thermoplastic additive, a reactive or non-reactive diluent, and a thixotrope should be included. In addition, the inventive adhesive may be placed in film form, in which case a support constructed from nylon, glass, carbon, polyester, polyalkylene, quartz, polybenzimidazole, polyetheretherketone, polyphenylene sulfide, poly p-phenylene benzobisoaxazole, silicon carbide, phenolformaldehyde, phthalate and napthenoate should be included.

Compositions of the present invention may ordinarily be cured by heating to a temperature in the range of about 120 to about 180° C. for a period of time of about 30 minutes to 4 hours. Thus, the inventive compositions can be used at relatively moderate temperatures to achieve very good productivity.

The inventive compositions (and pregregs and towpregs prepared therefrom) are particularly useful in the manufacture and assembly of composite parts for aerospace and industrial end uses, bonding of composite and metal parts, core and core-fill for sandwich structures and composite surfacing.

The invention also provides a process for producing a heat curable composition. The steps of this process includes:

(a) providing a benzoxazine comprising

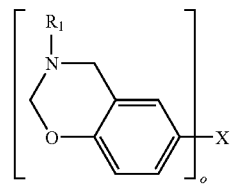

where o is 1-4, X is a direct bond (when o is 2), alkyl (when o is 1), alkylene (when o is 2-4), carbonyl (when o is 2), thiol (when O is 1), thioether (when o is 2) sulfoxide (when o is 2), sulfone (when O is 2) and $R_1$ is alkyl;

(b) providing with mixing a toughener component comprising acrylonitrile-butadiene co-polymer having secondary amine terminal groups; and (c) mixing the benzoxazine and the toughener component under conditions appropriate to produce the heat curable composition.

This invention is further illustrated by the following representative examples.

EXAMPLES

In a first comparative example, the following components were used to prepare Sample Nos. 1-2 as noted in Table 1.

TABLE 1

| Component | Sample No./Amt. (parts) | |
|---|---|---|
| | 1 | 2 |
| Benzoxazine* | 75 | 75 |
| Epoxy** | 25 | 25 |
| ATBN | — | 10 |

*believed to have been made from bisphenol F, thiodiphenol, aniline and formaldehyde, and is available from Vantico under trade designation RD 2001-081.
**CY179, commercially available from Vantico.

Each of the samples was prepared as follows:

The benzoxazine was warmed at a temperature in the range of 180-200° F. to render it flowable, without initiating curing.

Where an epoxy component was present, the flowable benzoxazine was mixed with the epoxy at a temperature of 180° F. until a homogeneous mixture was formed.

Where ATBN was present, the ATBN was mixed into the mixture at a temperature in the range of 160-180° F.

The composition so formed was mixed under a vacuum, at a temperature in the range of 160-180° F. for a period of time of 15-30 minutes. The so formed composition was stored in a closed container at room temperature.

The samples noted in Table 1 may be cured in an open face mold placed in an autoclave using the following cure profile:

The samples were exposed to 90 psi pressure within the autoclave and the temperature therein was increased at a 5° F./min ramp rate to a temperature of 350° F., for a period of time of about 3 hours. The cured samples were then cooled to a temperature of about 90° F. in the mold at a 520 F./min ramp rate for a period of time of about 1 hour before use or evaluation.

The cured samples were evaluated using the following property tests:

Dynamic mechanical thermal analysis ("DMTA") was performed on cured samples using a double cantilever fixture. The cured samples were isothermally equilibrated at a temperature of 4020 C. in an oven and the temperature was increased at a 5° C./min ramp rate to a temperature of 250° C. Tg values were obtained from this DMTA evaluation from onset G', storage shear modulus.

The cured samples were also subjected to boiling water for 3 days, and weight gain was recorded. Tg values were obtained from these samples using a DMTA evaluation.

Density of uncured and cured samples was measured according to ASTM D 792, and cure shrinkage was then calculated.

Flexure strength and modulus was determined in accordance with ASTM D 790, using cured samples with the following specimen dimensions: 0.125×0.5×4 in., span 2 in., test speed: 0.05 in./min.

$K_{IC}$ and $G_{IC}$ was determined in accordance with ASTM D5045-96, using single edge notch bending ("SENB") specimens of the cured samples.

The results of these evaluations on Sample Nos. 1-2 are set forth in Table 2.

TABLE 2

| Properties | Sample No. | |
|---|---|---|
| | 1 | 2 |
| Cured density | 1.24 | 1.20 |
| Cure shrinkage | — | −1.8 |
| $T_g$, ° C. | 192 | 190 |
| Hot/Wet $T_g$, ° C. | 158 | 159 |
| Moisture uptake | 1.8 | 2.1 |
| Flexure strength | 17 | 15 |
| Flexure modulus | 0.70 | 0.50 |
| $G_{IC}$, in-lb./in$^2$ | 0.6 | 1.4 |

In comparing these results from Sample Nos. 1 and 2, it is clear that Tg did not change appreciably by the addition of ATBN in this benzoxazine-epoxy system. Also, fracture toughness in terms of $G_{IC}$ increased over two fold. However, the comparison between Tg and Hot/Wet Tg of Sample Nos. 1-2 each had a large decrease. This is undesirable because under service conditions, a finished part made with such a composition would experience a low service temperature.

Next, Sample Nos. 3-11, which are within the scope of the invention, were prepared using Bm-type benzoxazine and, where noted, ATBN in the amounts noted in Tables 3a and 3b. Sample No. 3, without ATBN, was used for comparative purposes.

TABLE 3a

| Components | Sample No./Amt. (parts) | | | | |
|---|---|---|---|---|---|
| | 3 | 4 | 5 | 6 | 7 |
| B-m type Benzoxazine | 100 | 95 | 90 | 85 | 80 |
| ATBN | — | 5 | 10 | 15 | 20 |

TABLE 3b

| Components | Sample No./Amt. (parts) | | | |
|---|---|---|---|---|
| | 8 | 9 | 10 | 11 |
| B-m type Benzoxazine | 70 | 60 | 50 | 40 |
| ATBN | 30 | 40 | 50 | 60 |

The preparation process for each of Sample Nos. 3-11 was as described above with respect to Sample Nos. 1-2, as was the cure profile.

Sample Nos. 3-11 were cured and evaluated for property performance, results of which are shown below in Tables 4a and 4b.

TABLE 4a

| Properties | Sample No. | | | | |
|---|---|---|---|---|---|
| | 3 | 4 | 5 | 6 | 7 |
| ΔH, J/g | −213 | −207 | −173 | −168 | −154 |
| Cured density | | 1.12 | 1.09 | | |
| Cure shrinkage | | | | 1.0 | |
| $T_g$, ° C. | 177 | 180 | 188 | 197 | 202 |
| Hot/Wet $T_g$, ° C. | 168 | 170 | 182 | 190 | 202 |
| Moisture uptake | 1.1 | 1.1 | 1.1 | 1.5 | 1.3 |
| $G_{IC}$, in-lb. /in$^2$ | 0.7 | 2.3 | 1.9 | 2.3 | 3.2 |

TABLE 4b

| Properties | Sample No. | | | |
|---|---|---|---|---|
| | 8 | 9 | 10 | 11 |
| ΔH, J/g | −100 | −76 | −54 | −45 |
| Cured density | 1.08 | 1.04 | 1.00 | 0.99 |
| Cure shrinkage | | | | |
| $T_g$, ° C. | 204 | 204 | 227 | 232 |
| Hot/Wet $T_g$, ° C. | 208 | 217 | 222 | 232 |
| Moisture uptake | 1.1 | 1.4 | 1.7 | 2.2 |
| $G_{IC}$, in-lb./in$^2$ | 4.0 | | | |

In comparing these results from Sample Nos. 3-11, it is clear that Tg increased with the addition of ATBN into the Bm-type benzoxazine. Also, fracture toughness in terms of $G_{IC}$ increased with increased amounts of ATBN. And, the comparison between Tg and Hot/Wet Tg of Sample Nos. 3-11 showed that there was not an appreciable difference in these values, quite unlike the values observed with Sample Nos. 1-2.

For further comparative purposes, Sample Nos. 12-20 were prepared using either a bisphenol F-type, bisphenol A-type, Bm-type benzoxazine (as indicated) and, where noted, an epoxy resin, together with the tougheners indicated, ATBN in the amounts noted in Tables 5a and 5b.

TABLE 5a

| Components | | Sample No./Amt. (parts) | | | | |
|---|---|---|---|---|---|---|
| Type | Identity | 12 | 13 | 14 | 15 | 16 |
| Benzoxazine | B-m | — | — | — | — | — |
| | Bisphenol F | 75 | 75 | 50 | 55 | 58 |
| | Bisphenol A | — | — | — | — | — |
| Epoxy | CY 179 | 25 | 25 | 50 | 45 | 42 |
| Toughener | ATBN | — | 10 | — | — | — |
| | SILTEM* | — | — | 13 | — | — |
| | PES 5003P** | — | — | — | 9 | 17 |
| | CTBN | — | — | — | — | — |

TABLE 5b

| Components | | Sample No./Amt. (parts) | | | |
|---|---|---|---|---|---|
| Type | Identity | 17 | 18 | 19 | 20 |
| Benzoxazine | B-m | — | — | 100 | 100 |
| | Bisphenol F | 100 | — | — | — |
| | Bisphenol A | — | 80 | — | — |
| Epoxy | CY 179 | — | 20 | — | — |
| Toughener | ATBN | — | — | — | 18 |
| | SILTEM* | — | — | — | — |
| | PES 5003P** | — | — | — | — |
| | CTBN | 10 | — | — | — |

*Co-polymer of ULTEM 2000 and siloxane
**Polyether sulfone, commercially available from Sumitomo The preparation process for each of Sample Nos. 12-20 was as described above with respect to Sample Nos. 1 and 2, as was the cure profile.

Performance property evaluation of Sample Nos. 12-20 was performed as follows, with the results recorded in Tables 6a-6b.

Uncured samples were evaluated by Differential Scanning Calorimetry ("DSC"), within a temperature range of 40-350° C., where the temperature range increased at a 20° C./min ramp rate, and from which ΔH was recorded.

Cured samples were evaluated as above.

TABLE 6a

| | Sample No. | | | | |
|---|---|---|---|---|---|
| Property | 12 | 13 | 14 | 15 | 16 |
| ΔH, J/g | −367 | −320 | −340 | −266 | −263 |

TABLE 6b

| | Sample No. | | | |
|---|---|---|---|---|
| Property | 17 | 18 | 19 | 20 |
| ΔH, J/g | −353 | −431 | −213 | −168 |

Figure 2:
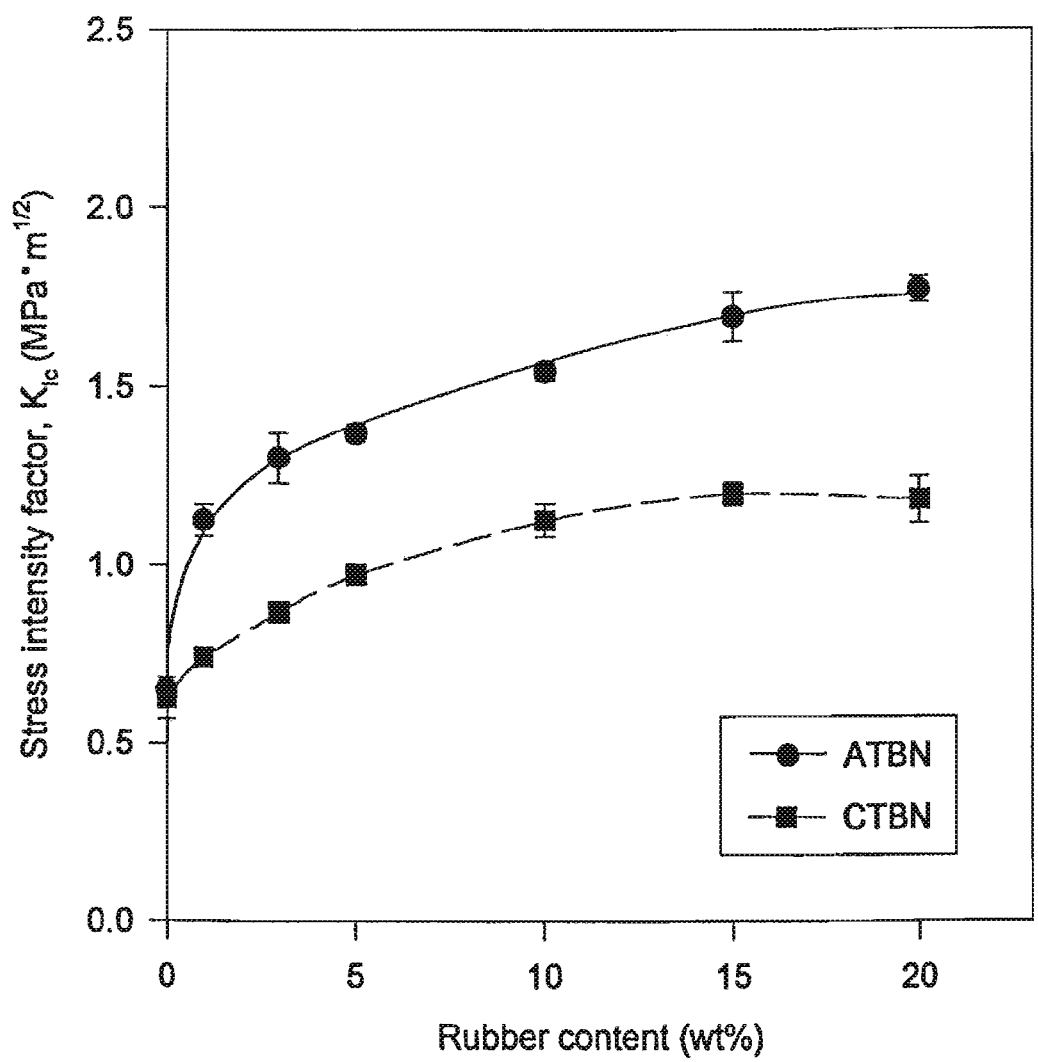
FIG. 2 is a representation of FIG. 3 from J. Jay et al., depicting a plot of G$_{IC}$ vs. ATBN and acrylonitrile-butadiene co-polymer having carboxyl terminal groups ("CTBN") concentration.
Figure 3:
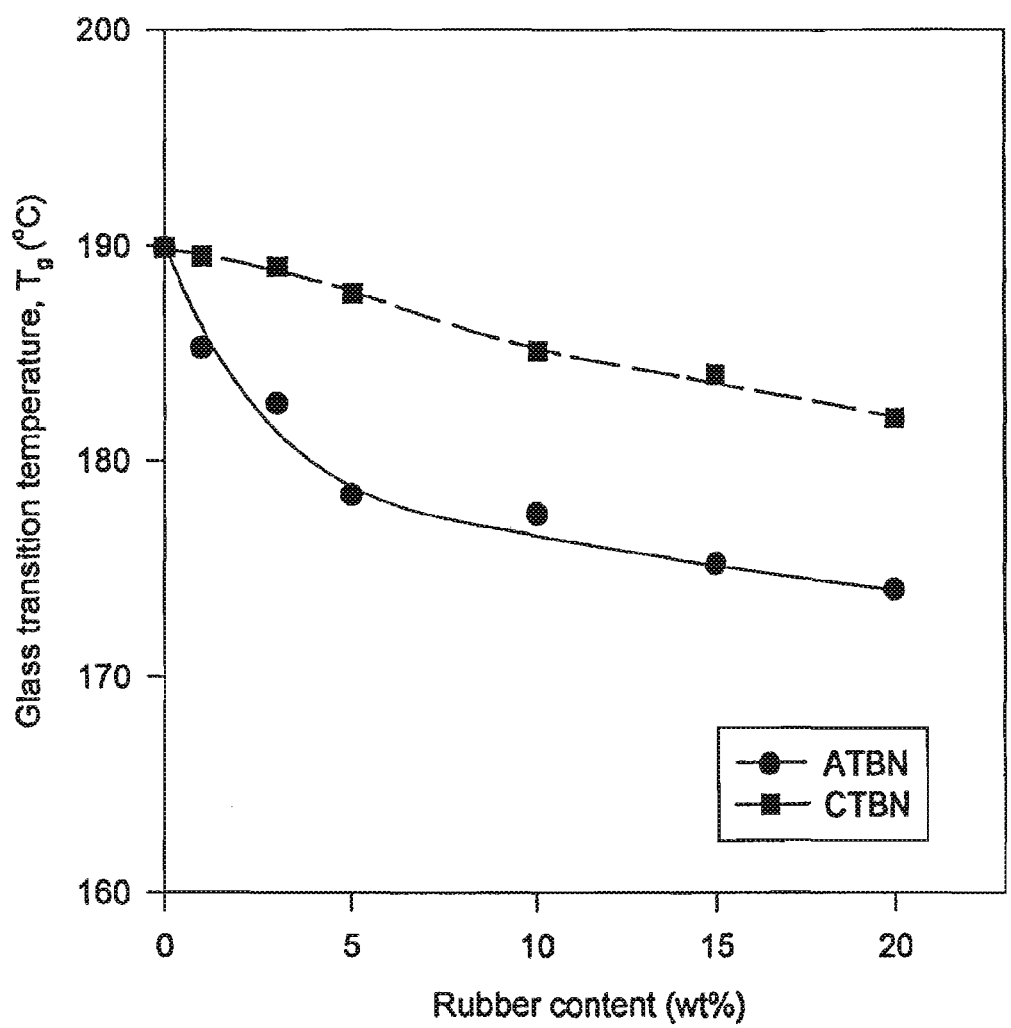
FIG. 3 is a representation of FIG. 6 from J. Jay, et al., depicting a plot of Tg vs. ATBN and CTBN concentration.

Reference to FIGS. 1-3 shows that with the inventive composition (illustrated in FIG. 1), an increase of ATBN concentration improves $G_{IC}$ and dry Tg and Hot/Wet Tg, while with benzoxazines outside of the claimed structure (illustrated in FIGS. 2-3), an increase of ATBN concentration improves $G_{IC}$ but decreases Tg. FIG. 1 shows that in the inventive composition Tg and toughness measured by $G_{IC}$ increase as the amount of toughener in the composition increases, whereas FIGS. 2 and 3 show that with either an aryl substituted benzoxazine (that is, where $R_1$ and/or $R_2$) and/or CTBN instead of ATBN the opposite result is illustrated.

An increased Tg such as 200 (dry), together with increased toughness such as 3, are not ordinarily found in the same thermoset system. One known exception to this is Cytec Industries 977-2, which provides an epoxy prepeg thermoset. However, this Cytec product is known to have a moisture uptake of about 3 to 5%, which contributes to low Hot/Wet Tg (such as about 300), and a high ΔH, such as 500-700 J/g, compared to the inventive compositions, which are demonstrated to be lower than 500 J/g with one as low as 163 J/g. A lower ΔH is desirable so that stresses within the assembled structure are not caused during cooling. And the thermosets from the inventive compositions have the potential to reach an increased Tg ordinarily not found, unless insoluble toughener materials are added, or have an unacceptable viscosity for many commercial applications.

What is claimed is:

1. A prepreg comprising a layer of fibers infused with a heat curable composition comprising:

(a) a benzoxazine component comprising

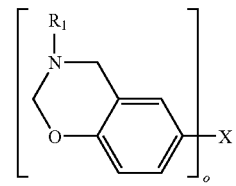

wherein o is 1-4, X is member selected from the group consisting of a direct bond (when o is 2), alky (when o is 1), alkylene (when o is 2-4), carbonyl (when o is 2), thiol (when o is 1), thioether (when o is 2), sulfoxide (when o is 2), and sulfone (when o is 2) , and $R_1$ is alkyl; and (b) about 5 weight percent or more of a toughener component comprising acrylonitrile-butadiene co-polymer having secondary amine terminal groups.

2. The prepreg of claim 1, wherein the fiber layer is made from unidirectional fibers.

3. The prepreg of claim 1, wherein the fiber layer is made from woven fibers.

4. The prepreg of claim 1, wherein the fiber is selected from the group consisting of carbon, glass, aramid, boron, polyalkylene, quartz, polybenzimidazole, polyetheretherketone, polyphenylene sulfide, poly p-phenylene benzobisoaxazole, silicon carbide, phenolformaldehyde, phthalate and napthenoate.

5. The prepreg of claim 4, wherein the glass is a member selected from the group consisting of S glass, S2 glass, E glass, R glass, A glass, AR glass, C glass, D glass, ECR glass, glass filament, staple glass, T glass and zirconium oxide glass.

6. The prepreg of claim 4, wherein the carbon is a member selected from the group consisting of polyacrylonitrile, pitch and acrylic.

7. Cured reaction products of the prepreg of claim 1.

8. A prepreg made by a process for producing a prepreg, steps of which comprise:
(a) providing a layer of fibers;
(b) providing a heat curable composition comprising:
(i) a benzoxazine component comprising

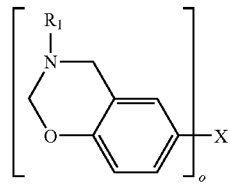

wherein o is 1-4, X s member selected from the group consisting of a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), and $R_1$ is alkyl; and
(ii) about 5 weight percent or more of a toughener component comprising acrylonitrile-butadiene, co-polymer having secondary amine terminal groups; and
(c) joining the heat curable composition and the layer of fibers to form a prepreg assembly, and exposing the resulting prepreg assembly to elevated temperature and pressure conditions sufficient to infuse the layer of fibers with the heat curable composition to form a prepreg.

9. A prepreg made by a process for producing a prepreg, steps of which comprise:
(a) providing a layer of fibers;
(b) providing a heat curable composition comprising:
(i) a benzoxazine component comprising

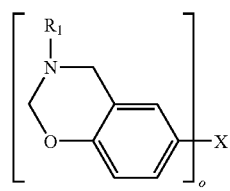

wherein o is 1-4, X is member selected from the group consisting of a direct bond (when o is 2), alkyl (when o is 1) alkylene (when o is 2-4), carbonyl (when o is 2), thiol (when o is 1), thioether (when o is 2), sulfoxide (when o is 2), and sulfone (when o is 2), and $R_1$ is alkyl; and
(ii) about 5 Weight percent or more of a toughener component comprising acrylonitrile-butadiene co-polymer having secondary amine terminal groups in liquid form;
(c) passing the layer of fibers through the liquid heat curable composition to infuse the layer of fibers with the heat curable composition; and
(d) removing excess heat curable composition from the prepeg assembly.

10. Cured reaction product of the prepreg of claim 8.

11. Cured reaction product of the prepreg of claim 9.

12. A towpreg comprising:
(a) a bundle of fibers infused with a heat curable composition comprising:
(i) a benzoxazine component comprising

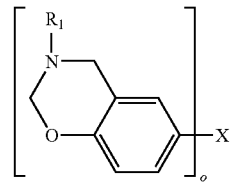

wherein o is 1-4, X is member selected from the group consisting of a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), and $R_1$ is alkyl; and (ii) about 5 weight percent or more of a toughener component comprising acrylonitrile-butadiene co-polymer having secondary amine terminal groups.

13. The towpreg of claim 12, wherein the fibers are selected from the group consisting of carbon, glass, aramid, boron, polyalkylene, quartz, polybenzimidazole, polyetheretherketone, polyphenylene sulfide, poly p-phenylene benzobisoaxazole, silicon carbide, phenolformaldehyde, phthalate and napthenoate.

14. The towpreg of claim 13, wherein the glass is a member selected from the group consisting of S2 glass, E glass, R glass, R glass, A glass, AR glass, C glass, D glass, ECR glass, glass filament, staple glass, T glass and zirconium oxide glass.

15. The towpreg of claim 13, wherein the carbon is a member selected from the group consisting of polyacrylonitrile, pitch and acrylic.

16. Cured reaction products of the towpreg of claim 12.

17. A towpreg made by a process for producing a towpreg, steps of which comprise:
(a) providing a bundle of fibers;
(b) providing a heat curable composition comprising:

(i) a benzoxazine component comprising

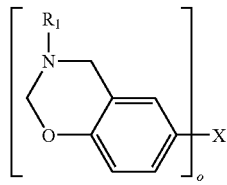

wherein o is 1-4, X is member selected from the group consisting of a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), and $R_1$ is alkyl; and (ii) about 5 weight percent or more of a toughener component comprising acrylonitrile-butadiene co-polymer having secondary amine terminal groups; and (c) joining the heat curable composition and the bundle of fibers to form a towpreg assembly, and exposing the resulting towpreg assembly to elevated temperature and pressure conditions sufficient to impregnate the bundle of fibers with the heat curable composition to form a towpreg.

18. A towpreg made by a process for producing a towpreg, steps of which comprise:
(a) providing a bundle of fibers;
(b) providing a heat curable composition comprising:
(i) a benzoxazine component comprising

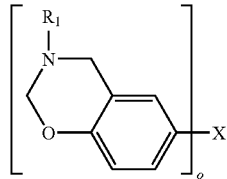

wherein o is 1-4, X is member selected from the group consisting of a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), and $R_1$ is alkyl; and (ii) about 5 weight percent or more of a toughener component comprising acrylonitrile-butadiene co-polymer having secondary amine terminal groups in liquid form;

(c) passing the bundle of fibers through the liquid heat curable composition to impregnate the bundle of fibers with the heat curable composition; and (d) removing excess heat curable composition from the towpreg assembly, thereby forming a towpreg.

19. Cured reaction product of the towpreg of claim 17.
20. Cured reaction product of the towpreg of claim 18.
21. An adhesive film comprising a heat curable composition comprising:
(a) a benzoxazine component comprising

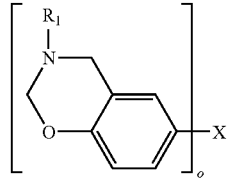

wherein o is 1-4, X is member selected from the group consisting of a direct bond (when o is 2), alkyl (when o is 1), alkylene (when o is 2-4) carbonyl (when o is 2) thiol (when o s 1), thioether (when o is 2), sulfoxide (when o is 2), and sulfone (when o is 2), and $R_1$ is alkyl; and (b) about 5 weight percent or more of a toughener component comprising acrylonitrile-butadiene co-polymer having secondary amine terminal groups.

22. The adhesive film of claim 21, further comprising a support selected from the group consisting of nylon, glass, carbon, polyester, polyalkylene, quartz, polybenzimidazole, polyetheretherketone, polyphenylene sulfide, poly p-phenylene benzobisoaxazole, silicon carbide, phenolformaldehyde, phthalate and napthenoate.

23. Cured reaction product of the adhesive film of claim 21.

\* \* \* \* \*